June 14, 1960 J. D. PATTERSON 2,940,242
NUT AND FRUIT HARVESTER
Filed Jan. 22, 1957 4 Sheets-Sheet 2
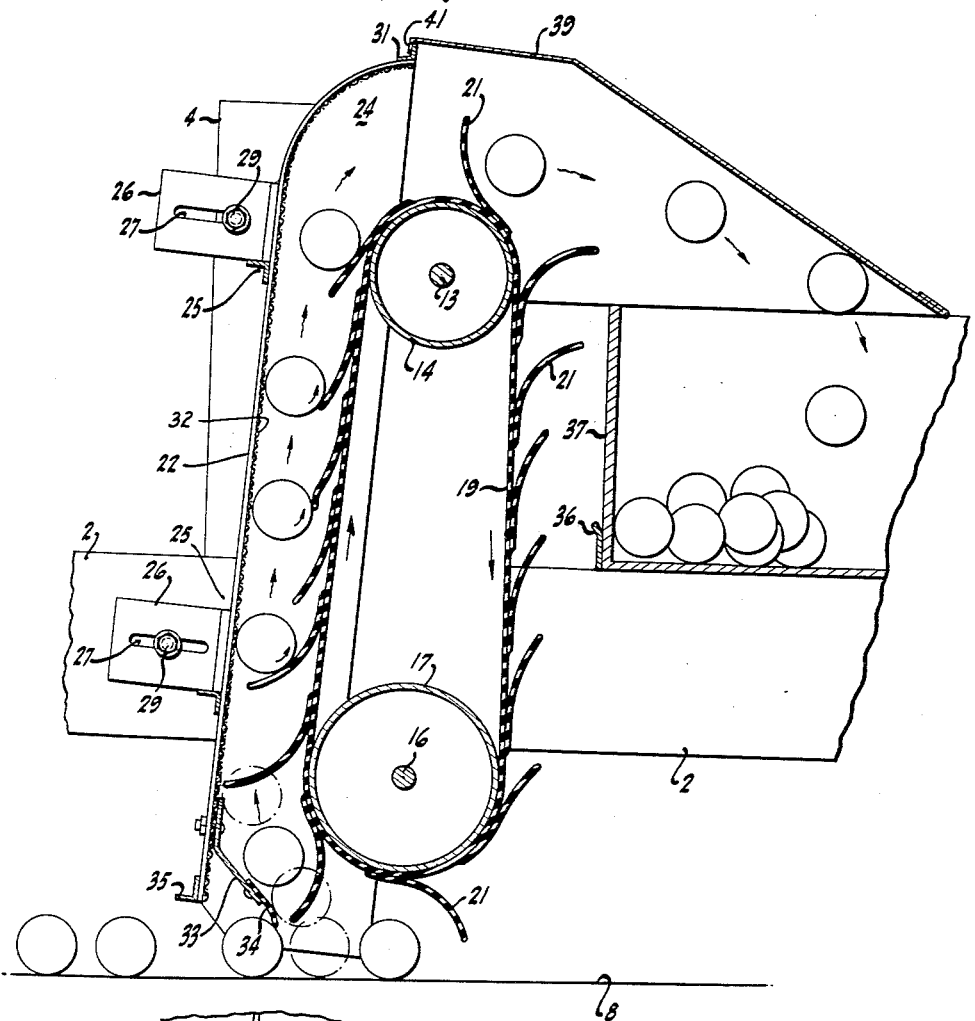
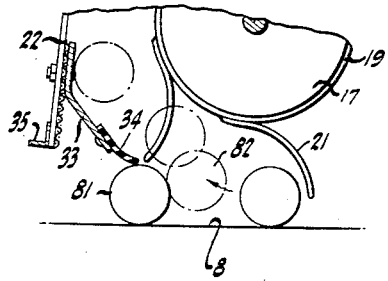
INVENTOR.
JAMES D. PATTERSON
BY
ATTORNEYS June 14, 1960  J. D. PATTERSON  2,940,242
NUT AND FRUIT HARVESTER
Filed Jan. 22, 1957  4 Sheets-Sheet 3

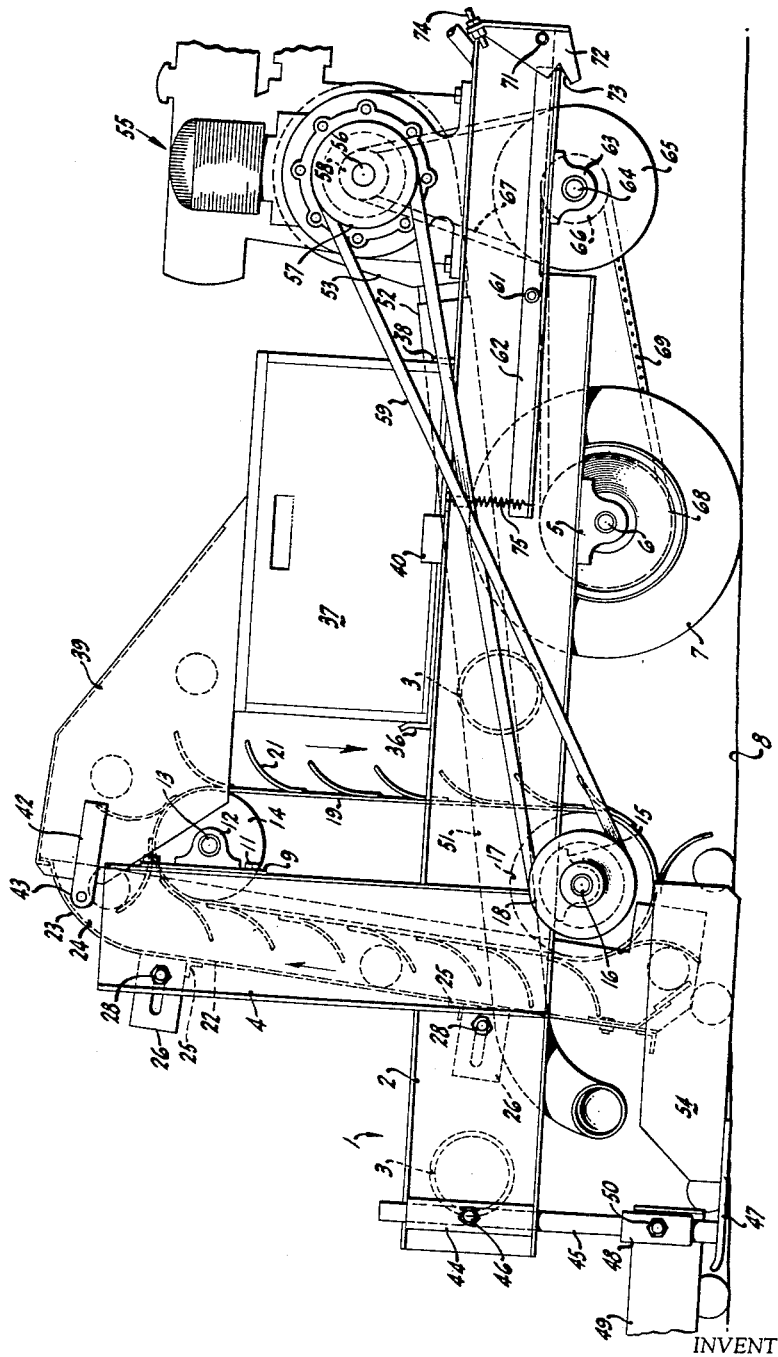

INVENTOR.
JAMES D. PATTERSON
BY
ATTORNEYS

United States Patent Office 2,940,242
Patented June 14, 1960

2,940,242
NUT AND FRUIT HARVESTER
James D. Patterson, 910 Cleveland Ave., Woodland, Calif.
Filed Jan. 22, 1957, Ser. No. 635,206
7 Claims. (Cl. 56—328)

This invention relates to and in general has for its object the provision of a harvester arranged to pick up or harvest nuts and fruit from the ground.

It is now the common practice to machine harvest nuts and fruit from the ground, the ground having been preliminarily cleared of debris, leveled and made substantially smooth by rolling. However, harvesters currently in use score or dig up the ground during the operation of the pick mechanism, thus raising and exposing clods and rocks which together with a certain amount of dirt are picked up with the crop to be harvested. This necessitates that the harvested crop be segregated from debris associated therewith and the washing of the segregated crop.

More specifically, one of the objects of my invention is the provision of a harvester having a pick-up mechanism which is always positively spaced from the ground and which, therefore, does not disturb the ground and thus avoids the inclusion of clods and rocks with the harvested crop.

Still more specifically, the object of this invention is the provision of a fruit and nut harvester including an endless flight of resilient pick flaps arranged to travel above the ground level at a linear speed substantially greater than the linear travel of the harvester and which serve to roll the nuts or fruit over which it travels against a ramp surrounding the forward side of the ramp and to roll the crop up and beyond the ramp into a lug box.

A further object of this invention is a provision in a harvester of the character above described wherein the lower end of its endless flight moves in the same direction as the direction of movement of the harvester at a speed in substantial excess of the speed of the harvester.

A further object of this invention is the provision of a harvester of the character above described wherein said endless flight of pick-up flaps is mounted adjacent the forward end of a vehicle frame, wherein said frame is mounted intermediate its ends on a pair of opposed, coaxial traction wheels and wherein a power unit is mounted on said frame adjacent its rear end for driving said harvester and its endless flight of pick-up flaps and for counterbalancing the harvester.

Still another object of this invention is the provision of a harvester of the character above described wherein means is provided adjacent the forward end of the harvester for gauging the level of the forward end of the frame with reference to the ground, but which bears substantially no part of the harvester.

The invention possesses other advantageous features, some of which, with the foregoing, will be set forth at length in the following description where those forms of the invention which have been selected for illustration in the drawings accompanying and forming a part of the present specification, are outlined in full. In said drawings, two forms of the invention are shown, but it is to be undertsood that it is not limited to such forms, since the invention as set forth in the claims may be embodied in other forms.

Referring to the drawings:

Fig. 1 is a side elevation of a harvester embodying the objects of my invention.

Fig. 2 is a fragmentary vertical section taken on the section line 2—2 of Fig. 4 through the pick-up assembly of the harvester illustrated in Fig. 1.

Fig. 3 is a fragmentary side elevation of the lower end of the pick-up assembly shown in Fig. 2 further illustrating its manner of operation in harvesting nuts or fruit.

Figure 4:
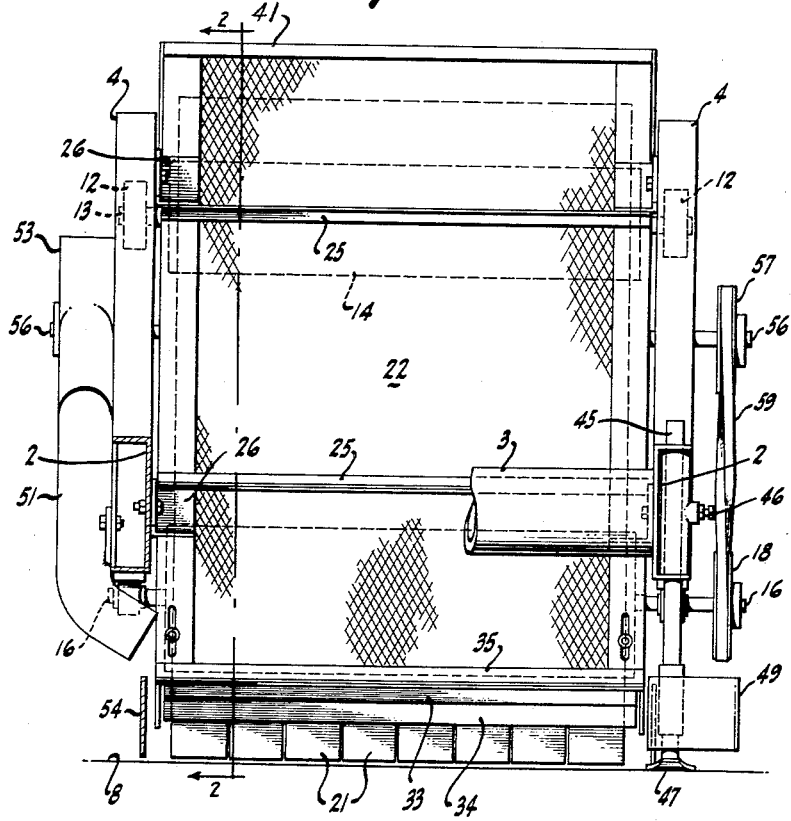
Fig. 4 is a front end elevation of the harvester illustrated in the above figures with parts thereof broken away and shown in section to better illustrate its construction.

The harvester illustrated in Figs. 1, 2, 3, and 4 comprises a generally rectangular fabricated steel frame generally designated by the reference number 1 and including opposed side channel beams 2 interconnected by parallel, longitudinally spaced tubular cross members 3. Welded or otherwise secured to each of the opposed beams 2 are upstanding channel columns 4, these channels being recessed into the side flanges of their associated channel beams 2. Here it should be noted that all of these channels are outwardly facing and that the columns 4 are located substantially forward of the centers of the beams 2.

Mounted on the lower flanges of the beams 2 rearwardly of the centers thereof are transversely aligned bearings 5 and journaled therein is a shaft 6. Mounted on each end of the shaft inboard of the beams 2 are a pair of opposed coaxial wheels 7 arranged to support the frame 1 from the ground 8.

Engaging the rear flanges of the columns 4 adjacent their upper ends are plates 9 provided with elongated slots and extending through these slots are bolts 11 having threaded engagement with the rear flanges of the columns 4. As a result of this construction the longitudinal position of each plate 9 can be adjusted at will. Affixed to each of the plates are bearings 12 and journaled therein is a shaft 13. Mounted on the shaft 13 within the confines of the columns 4 is an upper roll 14.

Affixed to the lower flange of each of the beams 2 is a bearing 15 having substantial vertical alignment with one of the upper bearings 12. Journaled in the transversely opposed bearing 15 is a shaft 16 and affixed thereto is a lower roll 17 and a pulley wheel 18, the roll 17 being disposed within the confines of the columns 4 and the pulley wheel 18 being disposed external to its adjacent column.

Reeved about the upper and lower rolls 14 and 17 is a flexible belt 19 and rigidly affixed thereto are a plurality of spaced rows of individual resilient pick-up flaps or fingers 21. Conveniently the flaps 21 can be made of fabric reinforced rubber and during the molding thereof they should be pre-set with an arch as shown in Figs. 1 and 2. From these figures it will be noted that the flaps are reversely arched in the direction of travel of their supporting belt 19 and that the belt 19 travels in a direction opposite the direction of the ground engaging wheels 7 when the harvester is traveling in a forward direction (from right to left as illustrated in Fig. 1). The resiliency of the flaps 21 should be such when the belt 19 is traveling at operating speed, they will straighten out somewhat as they pass around the rolls 14 and 17. Otherwise stated, although each flap is rigidly attached from one of its edges to its carrier or supporting belt, it is not itself rigid. Although not shown in the drawing each row of flaps consists of a plurality of contiguous individual flaps of a width somewhat greater than the diameter of the nuts or fruit being harvested.

Suspended over the forward reach of the belt 19 and its associated flaps 21 and normally having positive clearance with the latter is a sheet metal ramp 22 having a rearwardly curved upper end 23 and side walls 24. Secured to and across the front face of the ramp 22 are a pair of vertically spaced angles 25. Mounted on the angles 25 and welded to each side of the ramp 22 are angle brackets 26 each provided with an elongated horizontally extending slot 27. Extending through each of the slots 27 and through the web of the immediately adjacent channel column 4 is a bolt 28 and threaded over the free end of each bolt is a nut 29. As a result of this construction the ramp 22 is supported from the columns 4 so that its distance from the front reach of the belt 19 can be adjusted as desired.

Extending across and secured to the upper edge of the ramp 22 is an angle cleat 31 and secured to the inner face of the ramp is a wire mesh screen lining 32. If desired, an observation window can be provided in the ramp.

Bolted to the lower end of the ramp 22 and its lining 32 and extending over the inner face of the lining 32 is an inclined bracket 33 and rivetted to the lower edge thereof is an inclined flexible rubber skirt 34 extending into the locus of the outer ends of the flaps 21. Extending across the lower end of the ramp 22 is a stiffening angle 35.

Welded to and bridging the beams 2 rearwardly of the belt 19 and its flaps 21 is cleat 36 forming a stop for the front end of a lug box 37, the box 37 being supported on the beams 2 with its front side immediately adjacent the rear reach of the belt 19. Similarly welded to the beams 2 is a rear cleat 38 for confining the rear side of the box 37. The ends of the box are confined between laterally spaced fingers 40 extending upwardly from the beams 2. Here it should be noted that the box 37 is substantially balanced over the traction wheels 7.

Disposed over the upper end of belt 19 and extending rearwardly over a portion of the box is a hood 39 formed at its upper front corner with a depending flange 41 arranged to hook over the upper angle 31. Welded to the sides of the hood 39 at the front ends thereof are hinge straps 42, the front ends of these straps being pivoted by pins 43 to the side walls 24 of the ramp 22. As a result of this construction the hood 39 serves to guide the harvested crop into the lug box 37. When it is desired to remove the lug box the hood is simply swung forwardly out of the way.

Welded to the front ends of the beams 2 within the confines of their flanges are upstanding tubular bearings 44 and slidably disposed therein are level gauging rods 45. Threaded into each sleeve 44 is a set screw 46 for locking its associated rod 45 in any predetermined longitudinal position. Fastened to the lower end of each of the rods 45 is a skid or shoe 47.

Disposed over the lower end of each of the gauge rods 45 immediately above its skid 47 is a sleeve 48 and welded thereto is a forwardly and outwardly curved fruit or nut guide plate 49. The two guide plates 49 therefore converge rearwardly and upon the forward movement of the harvester serve to guide the fruit or nuts into the path of the pick-up belt and out of the way of the shoes 47. Threaded through each of the sleeves 48 is a set screw 50 for locking the sleeves and their associated guide plates at any desired elevation.

Mounted on the harvester frame and extending along one side thereof is a conduit 51 terminating at its front end at a point forward of the lower end of the pick-up belt and intermediate the sides thereof. The rear end 52 of the conduit 51 communicates with the intake or low pressure side of a blower 53 thereby to subject the ground at a point in advance of the pick-up belt to a subatmospheric pressure. Optionally, the rear end of the conduit can be connected to the high pressure side of the blower if it be desired to blow away leaves and the like from the path of the pick-up mechanism rather than to suck them into the conduit 52.

Secured to the heel of each of the shoes 47 and extending rearwardly thereof is a baffle plate 54 in effect forming a continuation of the guide plates 49.

Mounted on the rear end of the harvester frame is a power unit here illustrated as engine 55 including a drive shaft 56. Driven directly by the drive shaft 56 or by an intermediate speed reducer are pulley wheels 57 and 58. Reeved around the pulley 58 is a crossed drive belt 59 extending around the pulley wheel 18 associated with the shaft 16.

Pivoted to the rear end of one of the harvester frame beams 2 by a pin 61 and within the confines of its flanges is an angle iron lever 62. Mounted on the horizontal flange of the lever 62 rearwardly of the pin 61 is a bearing 63 and journaled therein is a stub shaft 64. Fixed to the shaft 64 is a sprocket or pulley wheel 65 and a sprocket 66. Reeved about the pulley wheels 58 and 65 is a drive belt 67 and meshing with the sprocket 66 and a gear 68 keyed to the shaft 6 is a drive chain 69.

Pivoted to the rear offset end of the beam 2 by a pin 71 is a latch plate 72 formed at its lower end with a notch 73 arranged to receive the horizontal flange of the rear end of the lever 62. Secured to the upper end of the latch plate 72 is an operating rod 74. Fastened to and between the forward end of the lever 62 and the upper flange of the beam 2 is a tension spring 75 serving to bias the forward end of the lever 62 upwardly. As a result of this construction it will be seen that so long as latch plate 72 is in its normal position as shown in Fig. 1, the belt 67 will be under tension and in driving relationship with its associated pulley wheels 58 and 65. If, however, the latch plate 72 is rotated clockwise as a result of a pull on the rod 74, the right end of the lever 62 will move upwardly against the biasing action of the spring 75. This in turn serves to loosen the belt 67 and permit it to slip on either or both of its pulleys. This mechanism therefore serves as a clutch for controlling the traction wheels 7.

The ratios of these various pulleys should be such that the linear speed of the pick up belt 19 is about four times the linear travel of the harvester.

The shaft of the blower 53 can be directly connected to the engine shaft 56 or indirectly thereto through an intermediate gear in any well known manner.

Here it should be noted that the drive assembly above described has been illustrated merely by way of example and that the details thereof are of no particular importance insofar as this invention is concerned.

Preliminary to operating the harvester above described the level of the front end of the machine is so gauged by adjustment of the rods 45 that the pick-up flaps or fingers 21 at all times have positive clearance with the ground.

As the harvester traverses a swath over the bed of prunes (for example) to be harvested, its flexible skirt slides over the prunes. These prunes are then confined between the skirt 34 and the immediately oncoming row of flaps or fingers 21, which due to their speed of travel serve to roll such prunes forwardly over the ground and up the rear face of the skirt 34 and into the channel or space between the ramp 22 and the carrier belt 19. This movement of the prunes and their upward rolling movement over the ramp results from a succession of engagements of successive flaps 21 with the prunes, for due to the speed of travel of the flaps and their resiliency they each can pass over the prunes leaving it to the following flap to give the prune under consideration an additional upward roll before it has fallen any appreciable distance under the influence of gravity. Here it should be observed that because of this action of the flaps the prunes progress upwardly at a speed considerably less than the speed of travel of the flaps. The speed of travel of the flaps should therefore be such that the prunes pass through the harvester at a speed at least as great as the linear travel of the harvester for otherwise the harvester would become clogged.

If by chance as illustrated in Fig. 3 a prune 81 has not cleared the skirt 34, it itself may serve as a ramp over which a preceding prune 82 can climb or roll and which serves as a barrier for preventing the prune 82 from being forced forward of the skirt 34. Here it should be noted that the skirt 34 acts as a check valve in the sense that it will move counterclockwise when passing over a prune but will prevent a prune from being moved forwardly thereof.

The final action of each flap on the prune which it is advancing is to roll the prune up the ramp and in so doing it straightens out but immediately upon leaving the prune it resumes its normal arcuate form and is in a position to engage another prune above it. Although strictly speaking the movement of each prune may be incremental from a practical standpoint, it appears to be substantially steady and continuous. Here it should be noted that the centrifugal force to which the flaps are subjected when passing around the rolls 14 and 17 causes the flaps to straighten out somewhat with a resulting increase in the pressure between the flaps and the prunes within this zone.

It should be particularly noted that since neither the flaps 21 nor any other part of the harvester contacts the ground in advance of and within the path traversed by the pick-up mechanism, the ground is in no way disturbed and consequently no clods or rocks are presented to the pick-up mechanism. My machine, therefore, obviates the necessity of subsequently effecting a separation between the prunes and foreign matter.

The blower merely clears the swath traversed by the machine of leaves and the like which might otherwise result in the improper operation of the harvester.

Since the harvester is balanced with respect to the traction wheels 17, the gauging shoes 47 bear substantially no part of the weight of the harvester and as a consequence the harvester is readily maneuverable. By locating the lug box 37 directly over the traction wheels 7 the continuously increasing load of prunes or nuts delivered to the lug box in no way disturbs the balance of the harvester and thus the gauging shoes 47 always maintain the pick-up assembly properly spaced from the ground with its flaps always having positive clearance with the ground.

Here it should be noted that some crops are heavier than others and that to obtain the proper rolling action of a heavier crop a greater pressure is required between the flaps and the crop. This additional required pressure can be obtained by lowering the pick-up assembly to any desired degree so long as the flaps have positive clearance with the ground. For example, prunes are substantially heavier than walnuts and therefore if prunes are being harvested, the pick-up unit should be adjusted to a level somewhat lower than required when walnuts are being harvested.

Figure 5:
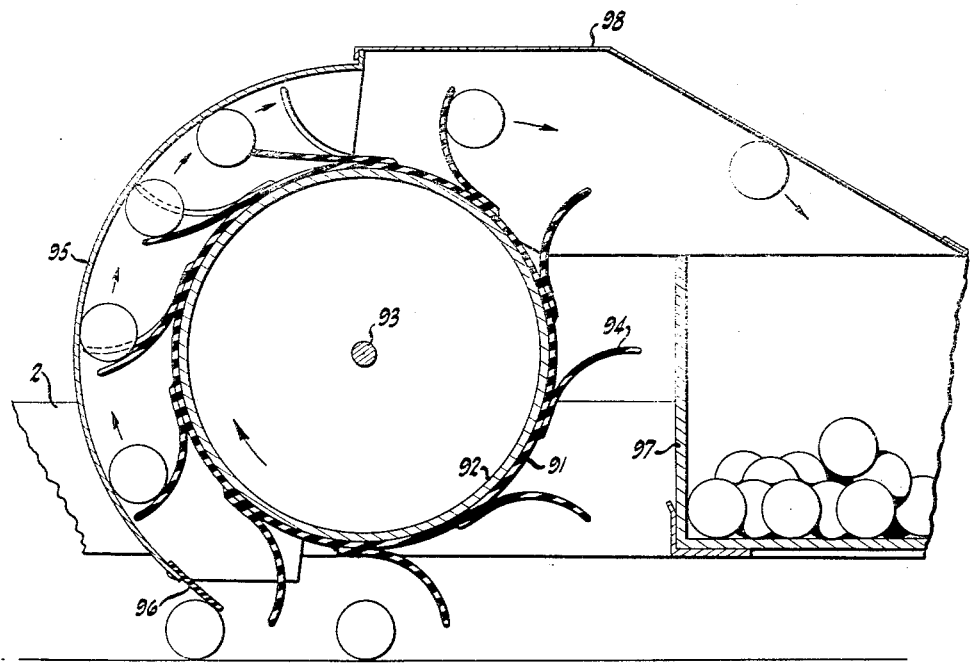
Fig. 5 is a fragmentary elevational view with parts broken away and shown in section of a modification of the harvester illustrated in Figs. 1–4.

With one major exception the harvester illustrated in Fig. 5 is in principle identical with the harvester above described. Here the flap carrier instead of being in the form of an endless belt traveling about a pair of vertically spaced rolls, consists of a cylindrical belt or carrier 91 tightly wrapped about a single drum or cylinder 92, the drum 92 being mounted on a shaft 93 journaled on the opposed frame beams 2. Mounted on the belt or carrier 91 are a plurality of circumferentially spaced rows of contiguous arcuate pick-up fingers or flaps 94. Surrounding the forward face of the pick-up belt 91 and the associated flap or fingers 94 is a semi-circular ramp 95 terminating at its lower edge in a resilient skirt 96.

As in the model previously described a lug box 97 straddles the beams 2 rearwardly of the pick-up mechanism and disposed over the rear half of the pick-up drum and the lug box 97 is a hood 98.

The operation of this latter modification is substantially the same as the modification illustrated in Figs. 1, 2, 3, and 4, and consequently it is deemed here unnecessary to illustrate and describe its drive mechanism and other details. The primary reason for including and showing this modification is to comply with the requirement of the Patent Office to the effect that all modifications referred to be illustrated.

I claim:

1. A harvester for picking up nuts and the like from the ground comprising: a vehicle frame having front and rear ends and supported intermediate its ends by a pair of opposed coaxial wheels arranged to have traction with the ground; an endless flap supporting conveyor mounted on the front end of said frame for movement in a closed path in parallelism with the axis of said traction wheels; means mounted on said frame for driving said flap supporting conveyor in a direction opposite to the rotation of said traction wheels when said harvester is traveling in a forward direction; a plurality of spaced, horizontal rows of contiguous, resilient flaps secured to the outer face of said flap supporting conveyor, said flaps normally being reversely arched in the direction of the direction of their travel and held by said conveyor out of contact with the ground; a ramp mounted on said frame forwardly of said endless conveyor but spaced therefrom and having a lower edge; said lower edge being spaced from the ground over which said harvester will operate; and a resilient skirt affixed to and depending from the lower end of said ramp as a continuation thereof a sufficient distance to engage said nuts but clear the ground.

2. A harvester of the character defined in claim 1 wherein one end of said frame is provided with means for gauging the level of the front end of said frame from the ground.

3. A harvester of the character defined in claim 1 wherein power means is mounted on the rear end of said frame for partially counterbalancing the forward end of said frame and its associated parts and for driving said traction wheels and said conveyor; the lineal speed of said conveyor being substantially greater than the lineal speed of said harvester.

4. A harvester of the character defined in claim 1 wherein means for producing a differential air pressure adjacent the lower end of said ramp, is mounted on said frame.

5. A harvester such as defined in claim 1 wherein a pair of vertically spaced horizontally extending parallel rolls is mounted on said frame and wherein said endless conveyor is reeved over said rolls.

6. A harvester of the character defined in claim 3 wherein a pair of vertically spaced, horizontally extending, parallel rolls is mounted on said frame and wherein said endless conveyor is reeved over said rolls.

7. A harvester of the character defined in claim 1 wherein a harvest receiving receptacle is mounted on said frame above and in alignment with the axis of said traction wheels.

References Cited in the file of this patent

UNITED STATES PATENTS

| | | |
|---|---|---|
| 2,402,201 | Martin | June 18, 1946 |
| 2,514,945 | Fortier | July 11, 1950 |
| 2,671,301 | Harrison | Mar. 9, 1954 |